US011988124B2

(12) United States Patent
Ballatore et al.

(10) Patent No.: US 11,988,124 B2
(45) Date of Patent: May 21, 2024

(54) EXHAUST SYSTEM FOR AN INTERNAL COMBUSTION ENGINE

(71) Applicant: FERRARI S.p.A., Modena (IT)

(72) Inventors: Marco Ballatore, Modena (IT); Matteo Ausili, Modena (IT); Simone Galuzzi, Modena (IT); Emanuele Magliano, Modena (IT)

(73) Assignee: FERRARI S.p.A., Modena (IT)

( * ) Notice: Subject to any disclaimer, the term of this patent is extended or adjusted under 35 U.S.C. 154(b) by 295 days.

(21) Appl. No.: 17/523,134

(22) Filed: Nov. 10, 2021

(65) Prior Publication Data

US 2022/0205376 A1 Jun. 30, 2022

(30) Foreign Application Priority Data

Dec. 30, 2020 (IT) ........................ 102020000032843

(51) Int. Cl.
*F01N 1/16* (2006.01)
*G10K 11/16* (2006.01)

(52) U.S. Cl.
CPC ............ *F01N 1/166* (2013.01); *G10K 11/161* (2013.01)

(58) Field of Classification Search
CPC ........ F01N 1/16; F01N 1/165; F01N 2410/00; F01N 2410/10; F01N 2410/12; G10K 11/161
See application file for complete search history.

(56) References Cited

U.S. PATENT DOCUMENTS 5,280,143 A * 1/1994 Kakuta ..................... F01N 1/24 181/257
7,337,609 B2 * 3/2008 Mahnken ................ F01N 3/023 181/254

(Continued)

FOREIGN PATENT DOCUMENTS

CN 112228196 A * 1/2021 ............. F01N 13/08
DE 102012112433 A1 6/2014

(Continued)

OTHER PUBLICATIONS

English translation of CN-112228196-A, accessed Dec. 12, 2023 via Espacenet <https://translationportal.epo.org/emtp/translate/?ACTION=description-retrieval&COUNTRY=CN&ENGINE=google&FORMAT=docdb&KIND=A&LOCALE=en_EA&NUMBER=112228196&OPS=ops.epo.org/3.2&SRCLANG=zh&TRGLANG=en> (Year: 2021).*

(Continued)

*Primary Examiner* — Jeremy A Luks
(74) *Attorney, Agent, or Firm* — CANTOR COLBURN LLP

(57) ABSTRACT

An exhaust system for an internal combustion engine and having an end chamber having a first inlet opening and a second inlet opening, which are separate from and independent of one another, and an outlet opening, through which exhaust gases are released into the atmosphere; an exhaust duct, which originates from the internal combustion engine and leads to the first inlet opening of the end chamber; a silencer device, which has an outlet opening, which directly leads to the second inlet opening of the end chamber; a bypass duct, which originates from the exhaust duct in the area of a bifurcation and ends in an inlet opening of the silencer device; and an adjustment valve, which can be electronically controlled, is arranged along the exhaust duct downstream of the bifurcation where the bypass duct origi- (Continued)

nates and is designed to adjust the exhaust gas flow towards the first inlet opening of the end chamber.

17 Claims, 10 Drawing Sheets

(56) References Cited

U.S. PATENT DOCUMENTS

| | | | | |
|---|---|---|---|---|
| 10,273,845 | B2 * | 4/2019 | Saxman | F01N 1/168 |
| 10,907,525 | B2 * | 2/2021 | Muramatsu | F01N 13/087 |
| 2020/0056519 | A1 * | 2/2020 | Soatti | F01N 1/08 |

FOREIGN PATENT DOCUMENTS

| | | | | | |
|---|---|---|---|---|---|
| EP | 0540891 | A1 | | 5/1993 | |
| EP | 1512851 | A2 | | 3/2005 | |
| JP | 2020002856 | A | * | 1/2020 | |
| JP | 2020016212 | A | * | 1/2020 | F01N 1/00 |

OTHER PUBLICATIONS

Search Report for Italian Application No. 102020000032843, completed Aug. 31, 2021, 8 pages.

* cited by examiner

EXHAUST SYSTEM FOR AN INTERNAL COMBUSTION ENGINE

CROSS-REFERENCE TO RELATED APPLICATIONS

This patent application claims priority from Italian patent application no. 102020000032843 filed on Dec. 30, 2020, the entire disclosure of which is incorporated herein by reference.

TECHNICAL FIELD

The invention relates to an exhaust system for an internal combustion engine.

PRIOR ART

Car type approval rules force manufacturers to limit the level of sound emissions, especially when the car drives at moderate speeds (namely, when it drives through city centres). As a consequence, the exhaust system (which fulfils the function of releasing the gases produced by the combustion into the atmosphere, limiting both the noise and the content of polluting substances) is always provided with at least one silencer, which is arranged along an exhaust duct downstream of the pollutant reducing devices.

Generally speaking, a silencer comprises a tubular body, which typically has an elliptical cross section and is provided with an inlet opening and with an outlet opening. Inside the tubular body there is defined a labyrinth, which determines a path for the exhaust gases from the inlet opening to the outlet opening; said labyrinth normally consists of diaphragms (or partitions), which are arranged crosswise (namely, perpendicularly to the longitudinal axis of the tubular body) so as to define chambers inside the tubular body, and of tubes, which connect the chambers to one another. In a traditional silencer ensuring a high damping of the noise at low engine speeds, the exhaust back pressure generated by the silencer (i.e. the loss of pressure caused in the exhaust gases when they flow through the silencer) exponentially grows as the number of revolutions per minute of the internal combustion engine increases (i.e. as the mean speed of the exhaust gases increases). As a consequence, in order to avoid too high exhaust back pressure values at high engine speeds (hence, excessively jeopardizing performances at high engine speeds), a bypass duct is provided, which is arranged in parallel to the silencer (namely, is designed to bypass the silencer) and is regulated by a bypass valve, which is kept closed at low engine speeds (so as to maximize the silencer action, sacrificing performances, which, anyway, are nor essential at low engine speeds) and is opened at high engine speeds (so as to reduce the exhaust back pressure to acceptable levels).

Furthermore, a significant component in the judgement of a high-performance sports car is the "quality" of the sound emitted by the exhaust system, which is an extremely important sensory feedback during the use of the car at its limit. However, known exhaust systems with a variable geometry (i.e. provided with one or more electrically or pneumatically controlled valves, which can change the path of the exhaust gases and, hence, of the sound along the exhaust system) do not always ensure that the sound emitted by the exhaust system corresponds to users' needs.

Generally speaking, turbocharged engines are disadvantaged as the presence of the turbine along the exhaust duct and of the compressor along the intake duct add a filtering and a lowering of the sound levels both of the exhaust system and of the intake system.

Furthermore, recent emission standards establish the use of exhaust gas treatment devices that significantly jeopardize sound performances, as a second catalytic converter or a particulate filter (also called GPF, i.e. "Gasoline Particulate Filter") must necessarily be present in series to the catalytic converter, even in petrol engines.

Patent documents U.S. Pat. No. 1,483,354A, KR20160108625A and GB2274681A describe an exhaust system for an internal combustion engine, wherein an exhaust duct, which originates from the internal combustion engine, has an end chamber, which ends with an outlet opening, through which exhaust gases are released into the atmosphere; the end chamber of the exhaust duct has at least one movable partition, which can be moved to different positions to vary the width of the outlet opening. In particular, the movement of the movable partition can be carried out manually (as described in U.S. Pat. No. 1,483,354A) or can automatically take place because of the pressure of the exhaust gases and against the elastic thrust generated by a spring that tends to minimize the width of the outlet opening (as described in KR20160108625A and GB2274681A).

Patent application DE102012112433A1 describes an exhaust system for an internal combustion engine having two twin exhaust ducts next to one another, each ending with a silencer device; the two exhaust ducts are connected to one another by means of a connection regulated by a throttle valve.

DESCRIPTION OF THE INVENTION

The object of the invention is to provide an exhaust system for an internal combustion engine; said exhaust system allows manufacturers to obtain, in all operating conditions, an ideal fluid-dynamic behaviour and a natural exhaust noise, suitable for the sports attitude of the car, and obviously complies with type approval rules, maximizing performances.

According to the invention, there is provided a an exhaust system for an internal combustion engine according to the appended claims.

The appended claims describe preferred embodiments of the invention and form an integral part of the description.

BRIEF DESCRIPTION OF THE DRAWINGS

The invention will now be described with reference to the accompanying drawings, which show some non-limiting embodiments thereof, wherein.

PREFERRED EMBODIMENTS OF THE INVENTION

Figure 1:
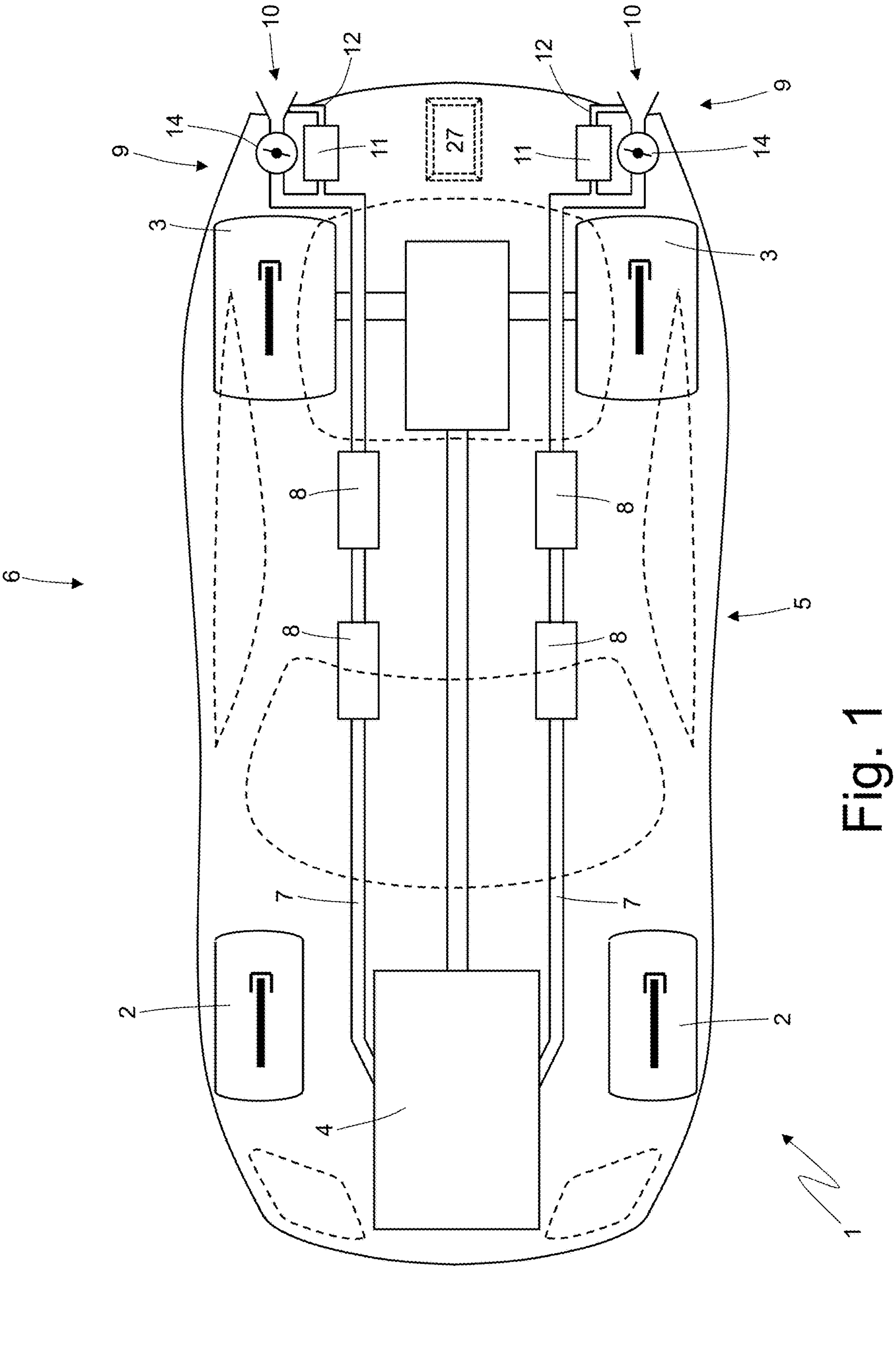
FIG. 1 is a schematic plan view of a car, which is driven by an internal combustion engine provided with an exhaust system according to the invention.

In FIG. 1, number 1 indicates, as a whole, a car provided with two front wheels 2 and with two rear drive wheels 3, which receive the torque from a internal combustion engine 4, which is supercharged by means of a turbocharger and is arranged in a front position.

The car 1 is provided with a passenger compartment 5 which is designed to house the driver and possible passengers.

According to a possible, though non-binding embodiment, the internal combustion engine 4 is a “V8” engine and has two (twin) banks with four cylinders arranged at an angle relative to one another so as to form a “V”. In each bank, the four cylinders are connected to an intake manifold (not shown) by means of two intake valves and to an exhaust manifold (not shown) by means of two exhaust valves; each exhaust manifold collects the gases produced by the combustion, which cyclically flow out through the exhaust valves.

The internal combustion engine 4 is provided with an exhaust system 6, which has the function of releasing the gases produced by the combustion into the atmosphere limiting both the noise and the content of polluting substances. The exhaust system 6 comprises two twin exhaust ducts 7, each originating from a corresponding exhaust manifold, so to receive the gases produced by the combustion from the exhaust manifold itself, and ending in the area of the tail of the car 1. Along each exhaust duct 7 there are known exhaust gas treatment devices 8: there always are at least one catalytic converter and a particulate filter or a further catalytic element (in order to comply with EURO6D standards on polluting emissions).

Each exhaust duct 7 (which originates from the internal combustion engine 4) has one single end chamber (part) 9, which ends with an outlet opening 10, through which exhaust gases are released into the atmosphere.

Figure 2:
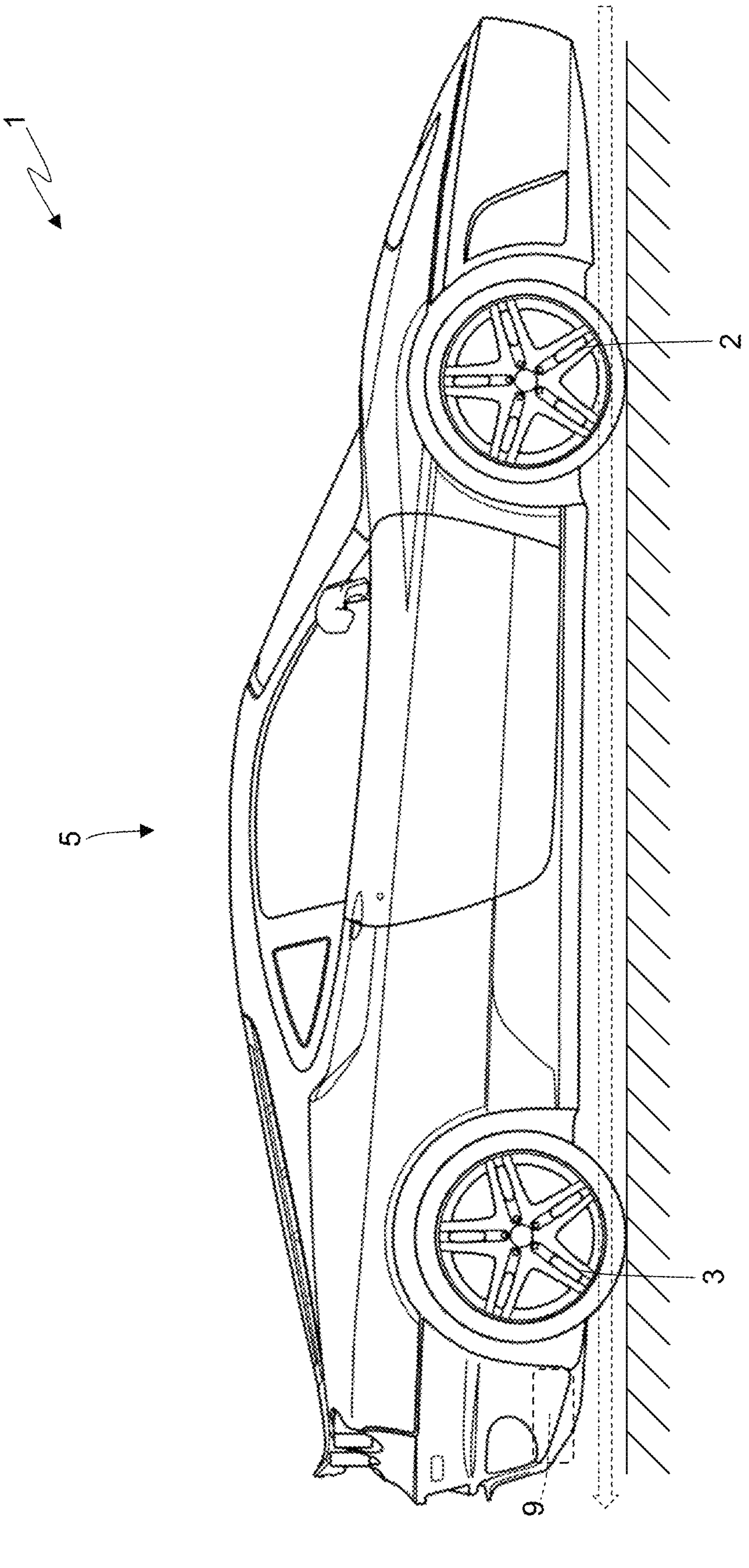
FIG. 2 is a lateral view of the car of FIG. 1.

According to FIG. 2, the car 1 comprises a bottom wall delimiting a lower surface, which faces a road surface and, in use, is brushed by an air flow flowing under the car 1.

Figure 3:
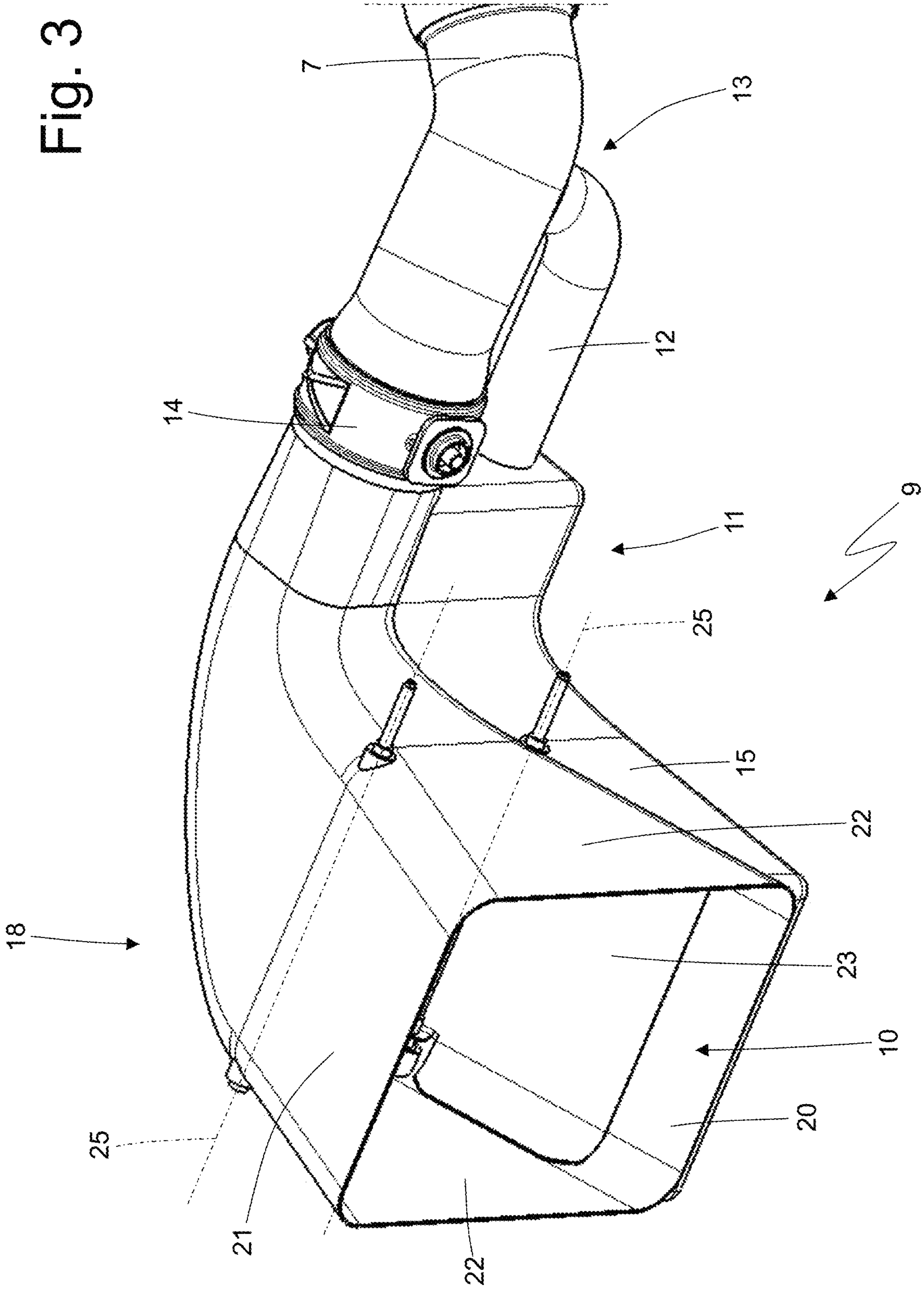
FIG. 3 is a perspective view of an end chamber provided with two movable partitions of an exhaust duct of the exhaust system of FIG. 1.
Figure 4:
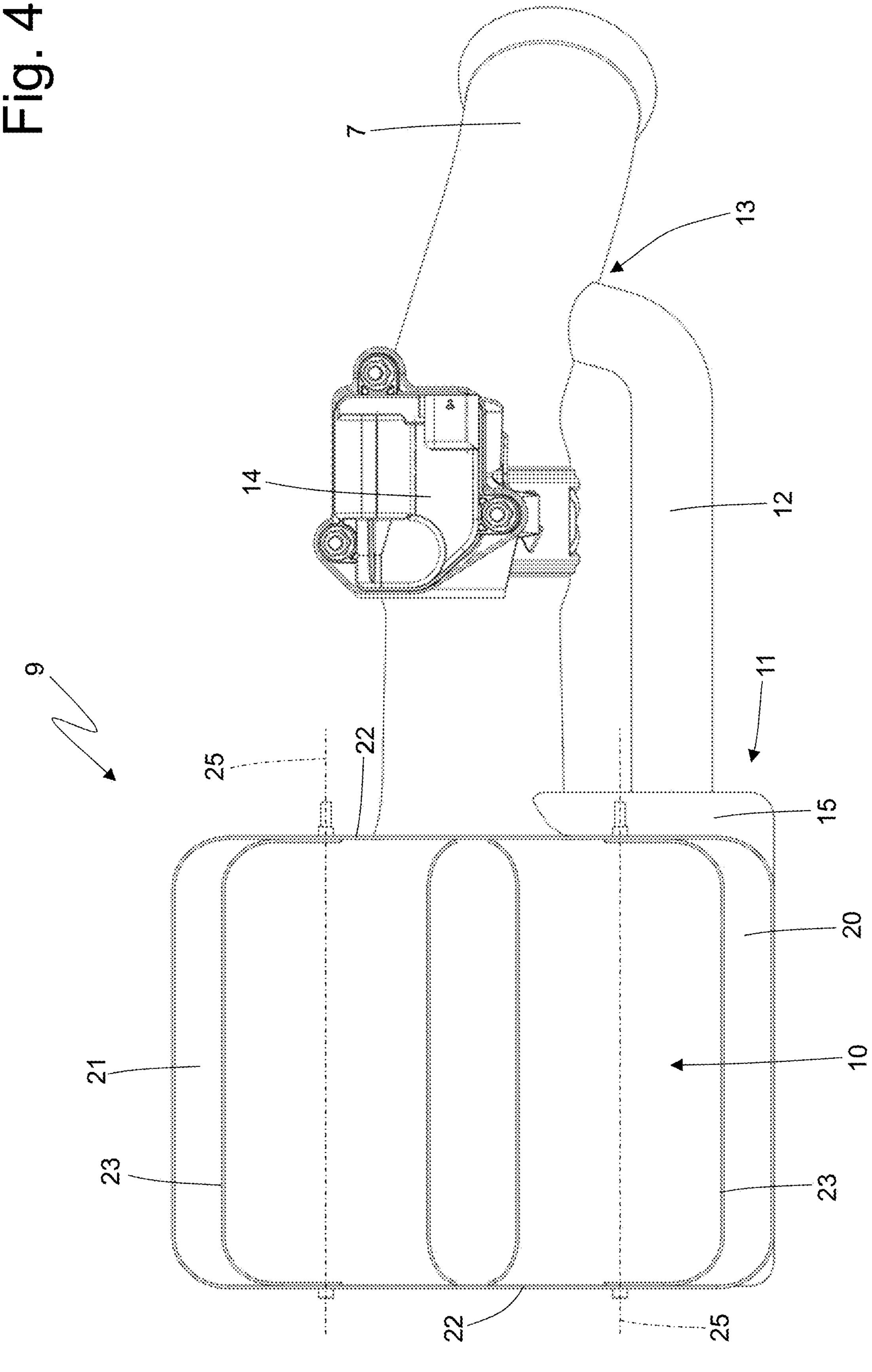
FIG. 4 is a front view of the end chamber of FIG. 3.
Figure 5:
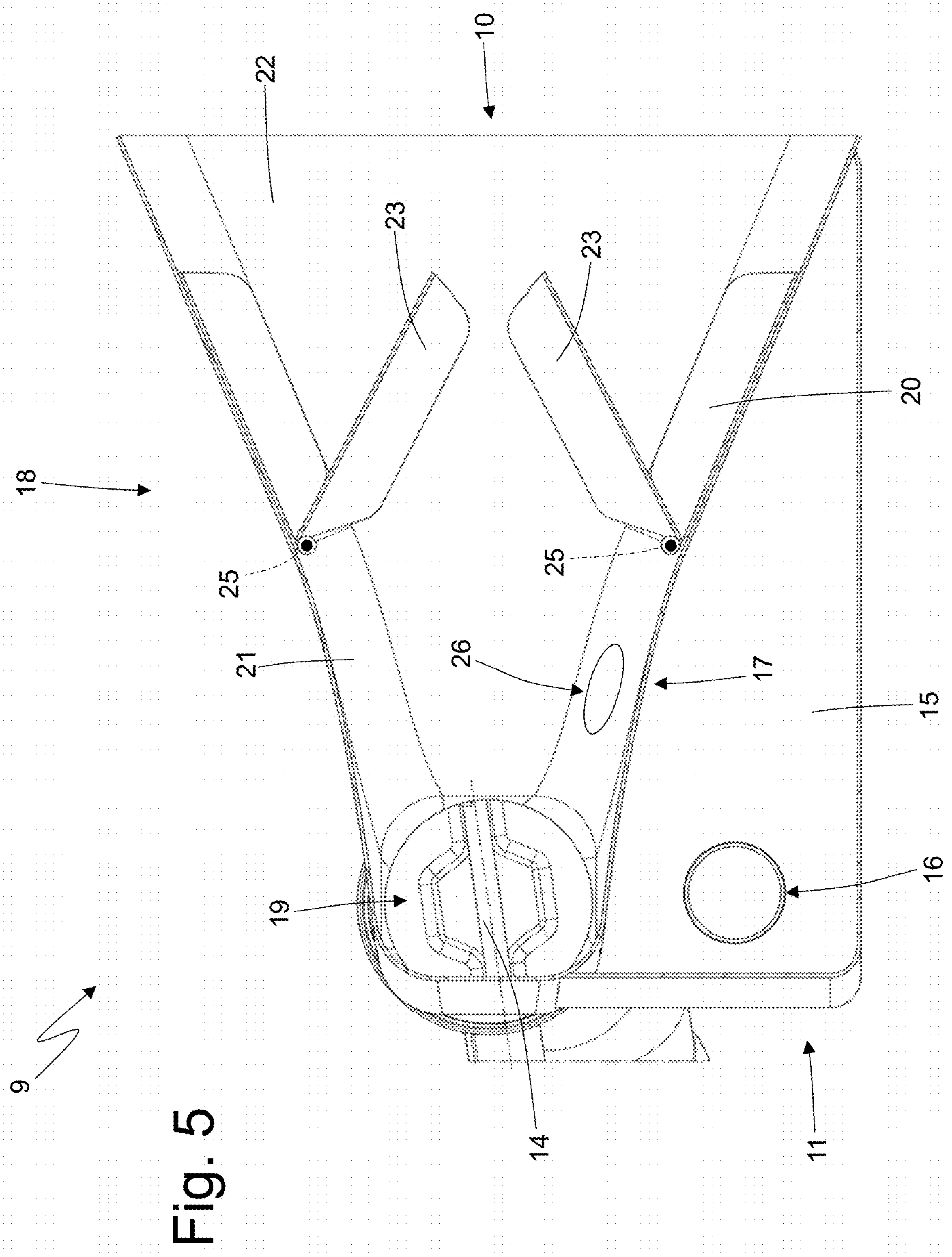
FIG. 5 is a longitudinal section view of a portion of the end chamber of FIG. 3.
Figure 7:
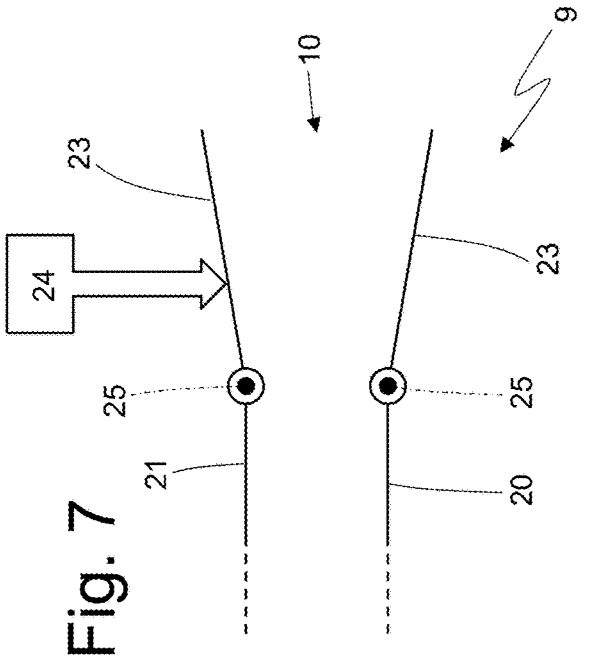
FIGS. 6-9 are schematic views of the end chamber of FIG. 3 with the movable partitions in different positions.

According to FIGS. 3, 4 and 5, the exhaust system 6 comprises, for each exhaust duct 7, a silencer device 11, which leads to the corresponding end chamber 9 (namely, which sends the exhaust gases flowing through it into the corresponding end chamber 9). Furthermore, the exhaust system 6 comprises, for each exhaust duct 7, a bypass duct 12, which originates from the exhaust duct 7 in the area of a bifurcation 13 and ends in an inlet of the corresponding silencer device 11; in other words, each bypass duct 12 is an alternative to the last segment of a corresponding exhaust duct 7.

Finally, the exhaust system 6 comprises, for each exhaust duct 7, an adjustment valve 14, which can be electronically controlled, is arranged along the exhaust duct 7 downstream of the bifurcation 13 where the corresponding bypass duct 12 originates (namely, is arranged between the bifurcation 13 and the end chamber 9) and is designed to adjust the exhaust gas flow towards the end chamber 9. Preferably, each adjustment chamber 14 has an even partial opening possibility between a completely closed position and a completely open position; namely, each adjustment valve 14 is not an ON/OFF valve, but can assume a range of intermediate positions between a completely closed position and a completely open position.

Each silencer device 11 is a traditional silencer device and, for example, consists of a tubular body 15, which is provided with an inlet opening 16 (where the corresponding bypass duct 12 is fitted), with an outlet opening 17, which leads to the end chamber 9, and with an inner labyrinth (not shown), which determines a path for the exhaust gases from the inlet opening 16 to the outlet opening 17.

When each adjustment valve 14 is open, the exhaust gases tend to directly flow into the end chamber 9, thus avoiding the bypass duct 12 and the silencer device 11 (because of the greater load losses experienced when flowing through the silencer device 11), whereas, when each adjustment valve 14 is closed, the exhaust gases are forced to flow through the bypass duct 12 in order to reach the end chamber 9. In other words, the adjustment valves 14 are moved towards a completely closed position in order to prevent the exhaust gases from flowing in the last segment of the exhaust ducts 7, thus forcing the exhaust gases, in order for them to reach the end chambers 9, to flow through the bypass ducts 12, which end in the silencer devices 11 and, as a consequence, damp noises to a greater extent and have a greater back pressure; vice versa, the adjustment valves 14 are moved to a completely open position in order to direct the exhaust gas flow towards the last segment of the exhaust ducts 7 (the bypass ducts 12 do not need to be closed as the greater back pressure determined by the silencer devices 11 minimizes the exhaust gas flow along the bypass ducts 12 when an alternative, freer path is available).

Each end chamber 9 comprises a tubular body 18 and has an inlet opening 19, which is connected to the exhaust duct 7, and the outlet opening 10 opposite the inlet opening 19. The exhaust gases coming from the exhaust duct 7 flow into the end chamber 9 (namely, into the tubular body 18) through the inlet opening 19 and flow out of the end chamber 9 (namely, the tubular body 18) through the outlet opening 10. Each end chamber 9 (namely, each tubular body 18) is shaped like a trumpet increasing in size towards the outlet opening 10, has a cross section with a rectangular shape and is delimited by two fixed base walls 20 and 21 (a lower and an upper wall, respectively), which are opposite one another and diverge towards the outlet opening 10, and by two fixed side walls 22, which are opposite and parallel to one another.

The end chamber 9 of each exhaust duct 7 has two movable partitions 23 opposite and facing one another, which can be moved to different positions (as evidently shown in FIGS. 6-9). In each end chamber 9 there is a motor-driven actuator device 24 (namely, provided with a preferably electric or pneumatic motor, which is designed to actively generate a movement), which is configured to move the movable partitions 23; preferably (though, not necessarily), each actuator device 24 is configured to move the two movable partitions 23 in an independent manner. In other words, each motor-driven actuator device 24 is active and is electronically (electrically) controlled so as to generate a force (torque) that determines a movement of the movable partitions 23; as a consequence, in each end chamber 9, the position of the movable partitions 23 is adjustable (by controlling the corresponding actuator device 24) completely independently of the pressure and the flow rate of the exhaust gases flowing through the end chamber 9 (for example, the movable partitions 23 can be moved so as to have a very large outlet opening 10, when the pressure and the flow rate of the exhaust gases are moderate, and can be moved so as to have a very small outlet opening 10, when the pressure and the flow rate of the exhaust gases are high).

According to a preferred embodiment, each movable partition 23 is hinged so as to rotate around a rotation axis 25 (which is arranged horizontally); namely, each movable partition 23 is hinged to the tubular body 25 in the area of a fixed base wall 20 or 21 so as to rotate around the rotation axis 25. As a consequence, each actuator device 24 is configured to rotate the two movable partitions 23 around the respective rotation axes 25 (in this way, the movement of the two movable partitions 23 can cause the two movable partitions 23 to move away from one another or can cause the two movable partitions 23 to move close to one another).

Figure 9:
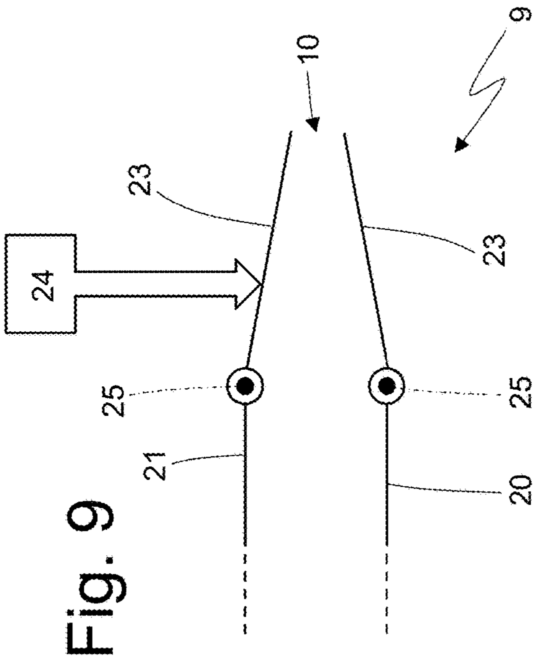
Figure 6:
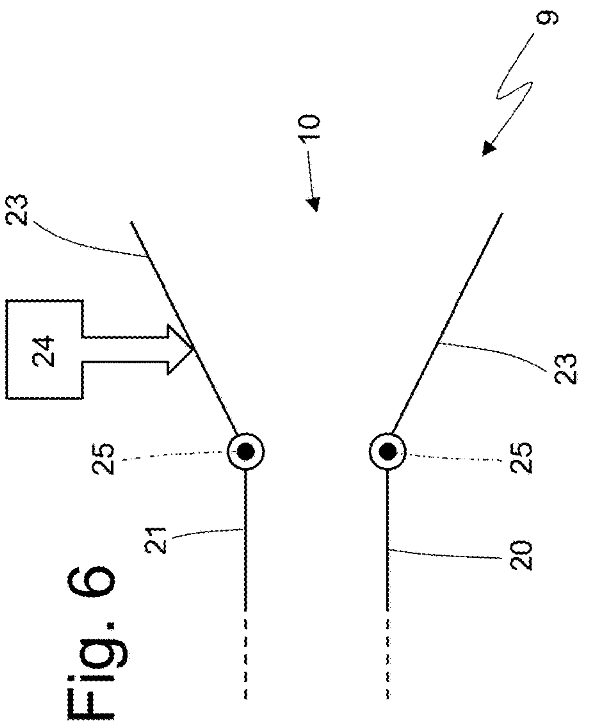
Figure 8:
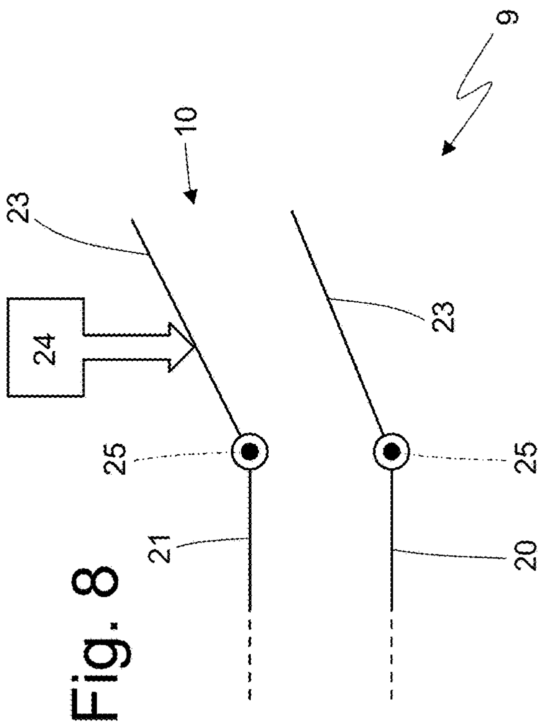

In the end chamber 9 of each exhaust duct 7, the two movable partitions 23 can be moved between a maximum expansion position (shown, for example, in FIG. 6) and a minimum expansion position (shown, for example, in FIG. 9); obviously, when the two movable partitions 23 are in the maximum expansion position (shown, for example, in FIG. 6), an area of the outlet opening 10 is (significantly) larger than an area of the outlet opening 10 when the two movable partitions 23 are in the minimum expansion position (shown, for example, in FIG. 9).

In the maximum expansion position (shown, for example, in FIG. 5), or even in other expansion positions (shown, for example, in FIG. 7), the two movable partitions 23 cause the end chamber 9 of the exhaust duct 7 to gain a diverging shape progressively increasing a cross section area as the outlet opening 10 gets closer.

According to a preferred embodiment, in the minimum expansion position (shown in FIG. 9), the two movable partitions 23 cause the end chamber 9 of the exhaust duct 7 to gain a converging shape progressively decreasing a cross section area as the outlet opening 10 gets closer.

Intermediate positions (shown, for example, in FIG. 8) between the minimum expansion position (shown in FIG. 9) and the maximum expansion position (shown, for example, in FIG. 5) are also possible.

Namely, each actuator device 24 is capable of placing and holding the two movable partitions 23 in intermediate positions between the maximum expansion position (shown in FIG. 6) and the minimum expansion position (shown in FIG. 9).

According to a possible embodiment shown in FIGS. 3, 4 and 5, each fixed base wall 20 or 21 also extends past the rotation axis 25 of the respective movable partition 23 (namely, each fixed base wall 20 or 21 does not end in the area of the respective movable partition 23) and, hence, in a maximum expansion position, the respective movable partition 23 rests against the fixed base wall 20 or 21. Furthermore, both movable partitions 23 are completely inserted inside the end chamber 9 (namely, inside the tubular body 18) and, hence, when they rotate around the respective rotation axes 25, they slide against the fixed side walls 22.

According to a possible embodiment shown in FIGS. 3, and 5, each silencer device 11 is arranged under the respective end chamber 9 (namely, the tubular body 15 of each silencer device 11 is arranged under the respective end chamber 9, i.e. under the tubular body 18). As a consequence, the lower base wall 20 of each end chamber 9 (namely, of each tubular body 18) comprises at least one inlet opening 26, through which the silencer device 11 leads (namely, overlapping the outlet opening 17 of the silencer device 11). Preferably, in each end chamber 9, the inlet opening 26 is arranged upstream of the movable partitions 23 relative to the exhaust gas flow.

In other words, each end chamber 9 has the inlet opening 19 and the inlet opening 26, which are separate from and independent of one another, and the outlet opening 10, through which exhaust gases are released into the atmosphere. The exhaust duct 7 originates from the internal combustion engine 4 and leads to the inlet opening 19 of the end chamber 9, whereas the silencer device 11 has an outlet opening 17, which directly leads to the inlet opening 26 of the end chamber 9. The bypass duct 12 originates from the exhaust duct 7 in the area of the bifurcation 13 and ends in the inlet opening 16 of the silencer device 11; furthermore, the adjustment valve 14 is arranged along the exhaust duct 7 downstream of the bifurcation 13 (namely, between the bifurcation 13 and the inlet opening 19) and is designed to adjust the exhaust gas flow towards the inlet opening 19 of the end chamber 9.

According to a preferred embodiment, each silencer device 11 is connected to the end chamber 9 so as to form one single body with the end chamber 9; namely, the tubular body 15 of the silencer device 11 is steadily and firmly connected (typically, by means of welding) to the end chamber 9 (namely, to the tubular body 18) and, hence, the tubular body 15 and the tubular body 18 could share the same fixed base wall 20 or 21. As mentioned above, each end chamber 9 (namely, each tubular body 18) is shaped like a trumpet increasing in size towards the outlet opening 10; the silencer device 11 has a shape that is complementary to the shape of the end chamber 9 (namely, of the tubular body 18) and, hence, decreases in size towards the outlet opening 10. In this way, the single body consisting of the tubular body 15 of the silencer device 11 and of the end chamber 9 (namely, the tubular body 18) has an approximately parallelepiped-shaped conformation.

There also is a control unit 27 (schematically shown in FIG. 1), which is configured to change the position of the movable partitions 23 of each end chamber 9 (by controlling the corresponding actuator device 24) depending on: a rotation speed of the internal combustion engine 4, an engine load of the internal combustion engine 4, a gear engaged in a gearbox coupled to the internal combustion engine 4, a longitudinal speed of a car 1 equipped with the internal combustion engine 4, and a longitudinal acceleration of the car 1 equipped with the internal combustion engine 4.

Namely, the control unit 27 is configured to detect (for example, by reading them from the BUS network of the car): the rotation speed of the internal combustion engine 4, the engine load of the internal combustion engine 4, the gear engaged in the gearbox, the longitudinal speed of the car, and the longitudinal acceleration of the car 1; knowing this information (which is read beforehand), the control unit 27 can establish the position of the movable partitions 23 of each end chamber 9 depending on this information.

The control unit 27 could be configured to change the position of the movable partitions 23 of each end chamber 9 also depending on the driving mode selected by the driver (namely, it can be a sports driving mode, a racing driving mode, a city driving mode, a motorway driving mode, a wet-road driving mode . . . , which is generally selected by the driver by acting upon a selector called "hand lever").

The control unit 27 has to control the position of the movable partitions 23 of each end chamber 9 so as to pursue three aims: complying with type approval regulations in terms of intensity of the sound emitted by the exhaust system (non-negotiable requirement that always has to be fulfilled), obtaining a high "quality" of the sound emitted by the exhaust system (namely, a type of sound emitted by the exhaust system that can be considered as pleasant by drivers and, hence, meet their expectations), and maximizing the performances of the internal combustion engine 4. Provided that the control unit 27 is configured to always comply with type approval regulations in terms of intensity of the sound emitted by the exhaust system, in some situations, the control unit 27 can favour the "quality" of the sound emitted by the exhaust system rather than the performances of the internal combustion engine 4, whereas, in other situations, the control unit 27 can favour the performances of the internal combustion engine 4 rather than the "quality" of the sound emitted by the exhaust system.

Generally speaking, the control unit 27 is configured to hold the movable partitions 23 of each end chamber 9 in a minimum expansion position in the presence of a small number of revolutions per minute and of small loads of the internal combustion engine 4 and to move the movable partition 23 of each end chamber 9 towards a maximum expansion position in the presence of a large number of revolutions per minute and of great loads of the internal combustion engine 4. Furthermore, the control unit 27 is configured to move the movable partitions 23 of each end chamber 9 towards a minimum expansion position in low gears and to move the movable partitions 23 of each end chamber 9 towards a maximum expansion position in high gears.

According to a preferred embodiment, in the control unit 27 there are stored different maps (each corresponding to one or more driving modes), which provide, as an output, the desired (ideal) position of the movable partition 23 of each end chamber 9 based on the data provided as an input on the number of revolutions per minute and on the engine load of the internal combustion engine 4 as well as on the gear engaged in the gearbox coupled to the internal combustion engine 4.

Obviously, each map stored in the control unit 27 comprises a limited number of points and, therefore, the control unit 27 could carry out interpolations between the closest points of a map in order to determine the desired (ideal) position of the movable partitions 23 of each end chamber 9.

In the maximum expansion position (shown, for example, in FIG. 5), the "open" namely "diverging" position of the movable partitions 23 of each end chamber 9 confers to the exhaust duct 7 the minimum exhaust back pressure and also confers to the exhaust duct 7 the minimum exhaust noise damping ability; on the other hand, in the minimum expansion position (shown, for example, in FIG. 9), the "closed" namely "converging" position of the movable partitions 23 of each end chamber 9 confers to the exhaust duct 7 the maximum exhaust noise damping ability.

The control unit 27 is configured to move the movable partitions 23 of each end chamber 9 towards the minimum expansion position (shown, for example, in FIG. 9) when it is necessary (useful) to favour silencing rather than performances and to move the movable partitions 23 of each end chamber 9 towards the maximum expansion position (shown, for example, in FIG. 5) when it is necessary (useful) to favour performances rather than silencing.

Figure 10:
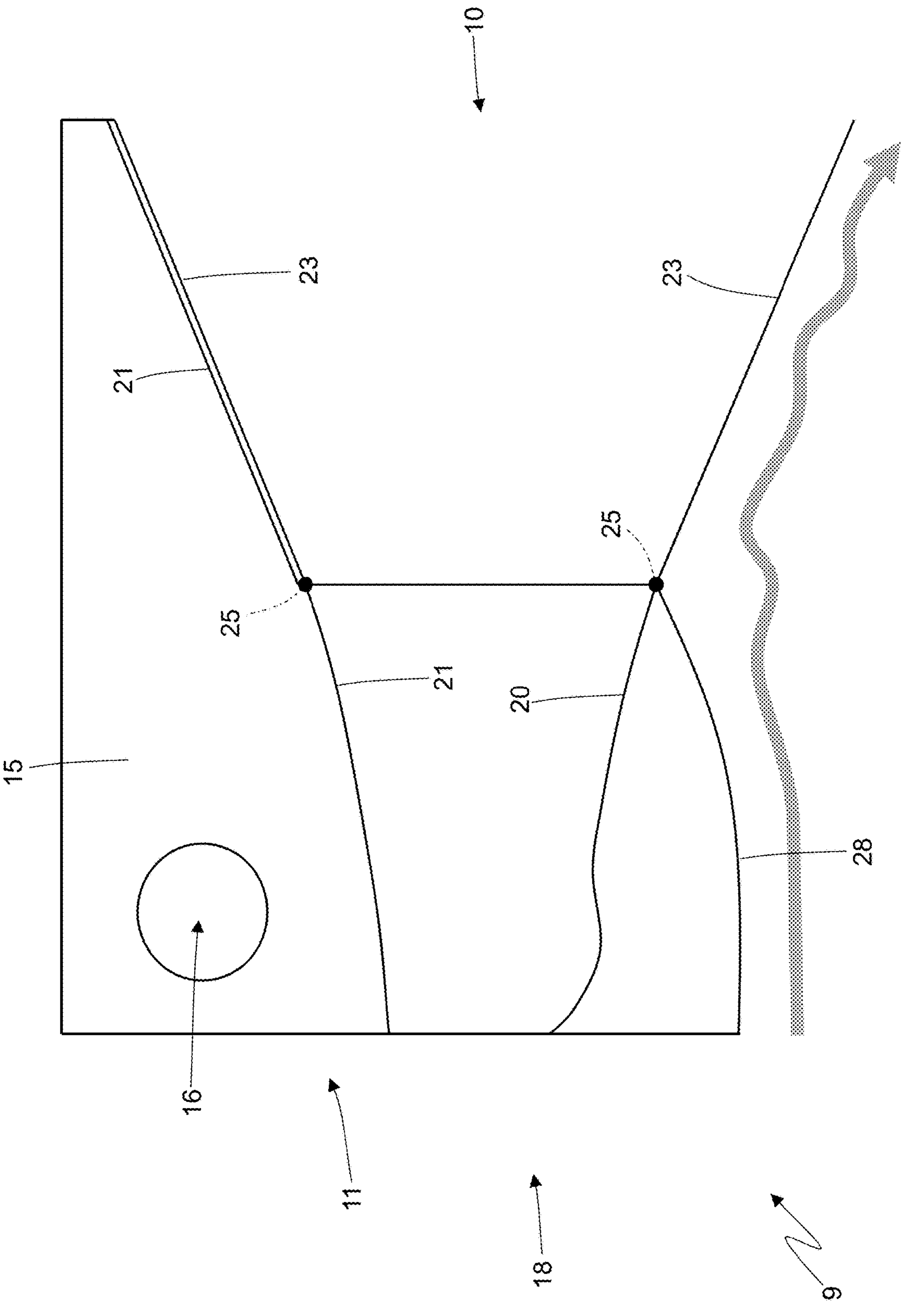
FIGS. 10, 11 and 12 are schematic views of a different embodiment of the end chamber of FIG. 3 with the movable partitions in different positions and highlighting the air flows flowing under the vehicle.
Figure 11:
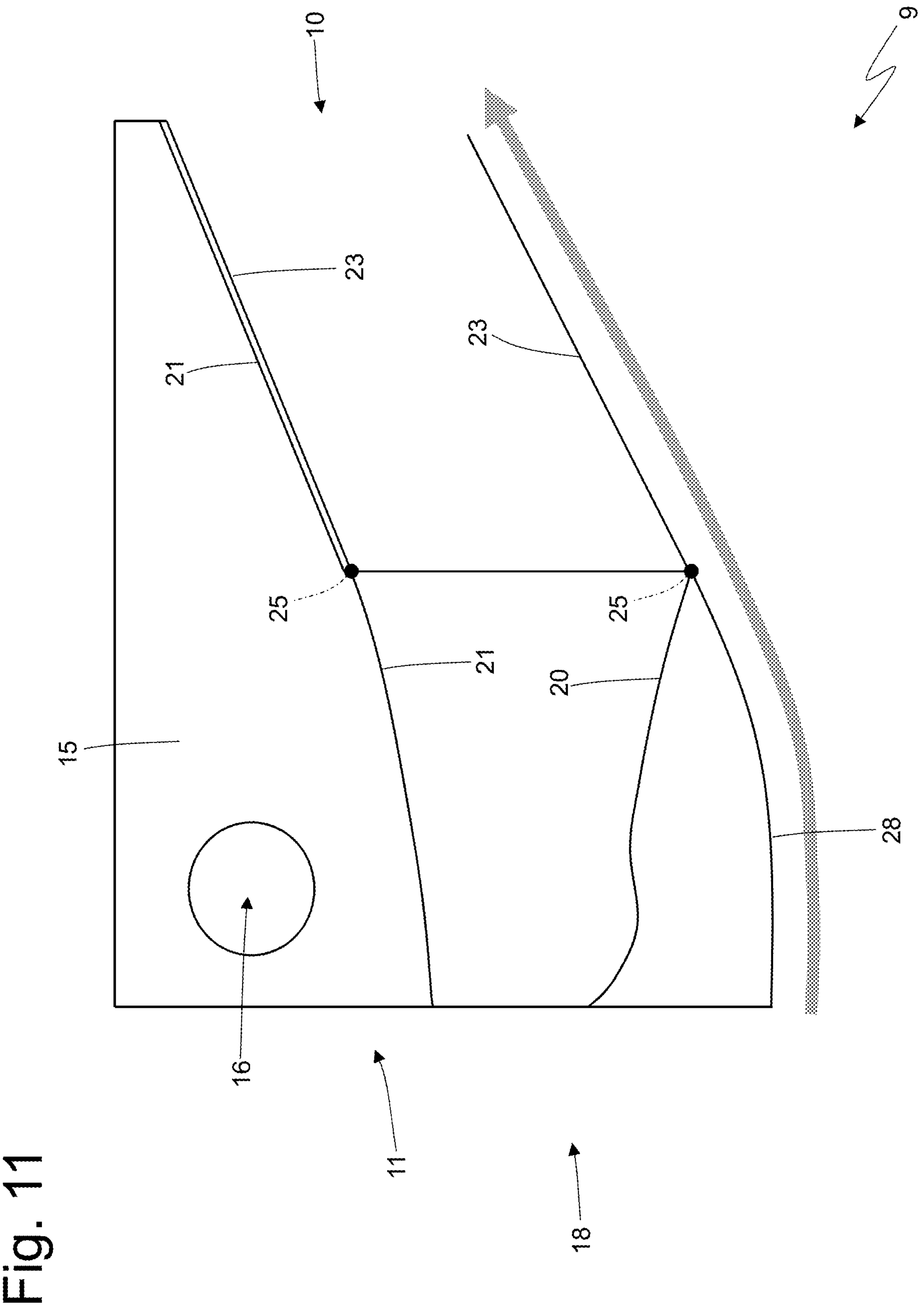
Figure 12:
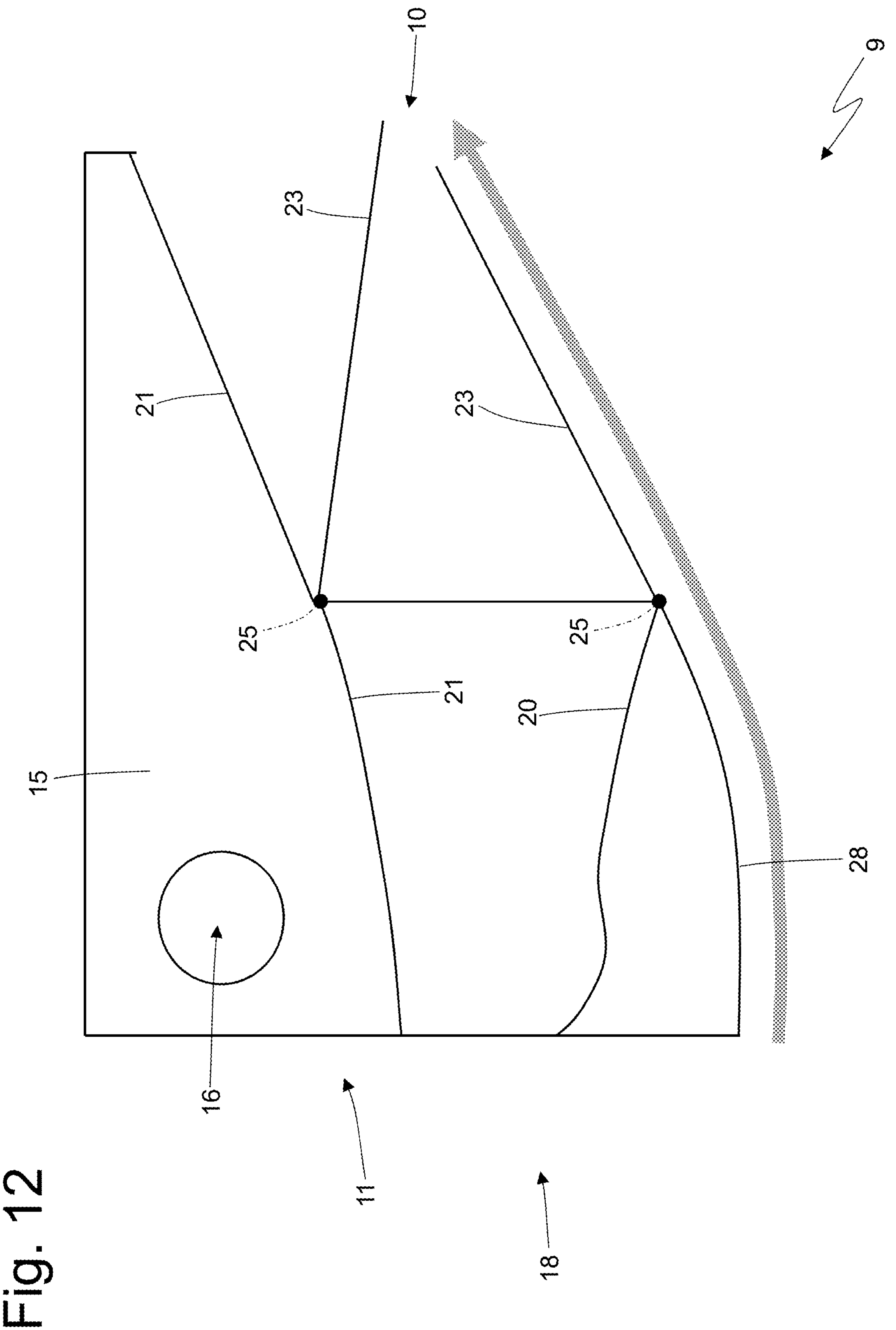

In the alternative embodiment shown in FIGS. 10, 11 and 12, in each exhaust duct 7, the silencer device 11 is arranged above the end chamber 9 (on the opposite side relative to the fixed base wall 20) instead of under the end chamber 9; furthermore, the (lower) fixed base wall 20 ends in the area of the rotation axis 25 of the respective movable partition 23 (namely, ends in the area of an end of the respective movable partition 23) and, as a consequence, the lower movable partition 23 delimits a lower surface of the end camber 9, which faces the road surface and, in use, is brushed by the air flow flowing under the car 1.

According to a preferred, though non-binding embodiment, there also is a fixed wall 28, which is connected to the end chamber 9 (namely, to the tubular body 18), covers the end chamber (9) at the bottom, lower than the (lower) fixed base wall 20, ends in the area of the rotation axis 25, delimits a lower surface of the end chamber 9 (namely, of the tubular body 18) facing the road surface and progressively increases a distance of its from the road surface towards the outlet opening 10.

In this embodiment, the control unit 27 is configured to change, by controlling the actuator device 24, the position of each lower movable partition 23 (namely, the one connected to the lower fixed base wall 20) also depending on the requested aerodynamic load and, hence, the control unit 27 is configured to move each lower movable partition 23 away from the road surface when a greater aerodynamic load is requested.

Indeed, by moving the lower movable partition 23 away from the road surface, the width of the "extractor channel" defined between the road surface and the lower movable partition 23 is increased, thus increasing the aerodynamic load of the "extractor channel".

In particular, at low and medium speeds (indicatively, below 150-180 km/h) the control unit 27 establishes the position of the partitions 23 of each end chamber 9 only based on silencing needs, whereas at high speeds (indicatively, above 150-180 km/h) the control unit 27 establishes the position of the partitions 23 of each end chamber 9 also and especially based on aerodynamic needs, favouring the generation of load at high speeds.

In the embodiment shown in the accompanying figures, the end chamber 9 of each exhaust duct 7 has two movable partitions 23 facing and opposite one another; according to different embodiments which are not shown herein, the end chamber 9 of each exhaust duct 7 has one single movable partition 23 or three or more movable partitions 23. In other words, the two opposite movable partitions 23 do not necessarily have to be present, there could be one single movable partition 23.

Figure 13:
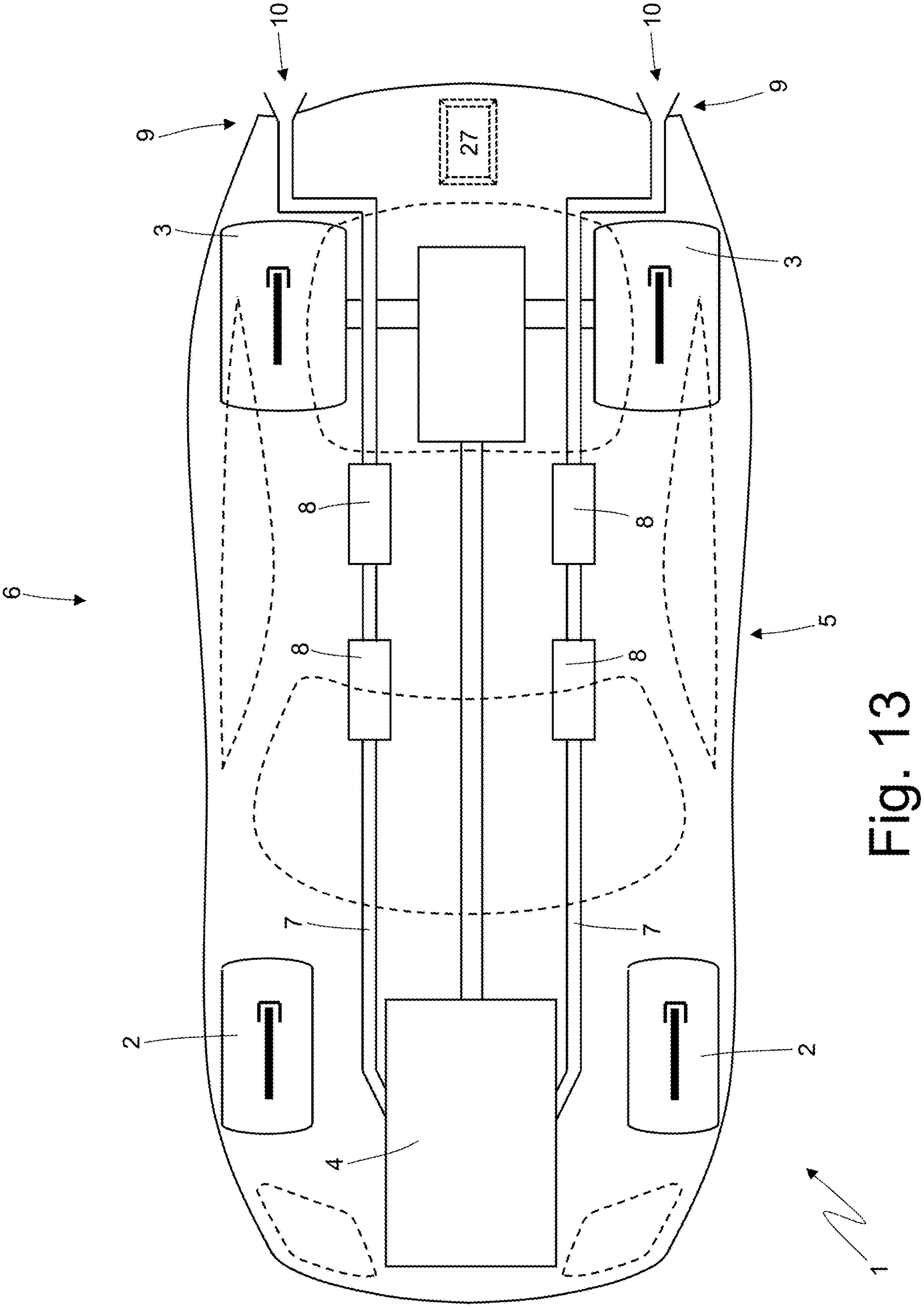
FIG. 13 is a schematic plan view of the car of FIG. 1, in which the exhaust system is designed according to a different embodiment.

In the variant shown in FIG. 13, there are neither the bypass ducts 12 (and, hence, the relative silencing devices 11) nor the adjustment valves 14; as a consequence, the entire management of the sound damping strategies is completely assigned to the variable geometry of the end chambers 9 of the exhaust ducts 7. In this embodiment, the lower movable partitions 23 preferably also have an aerodynamic function, since they delimit a lower surface of the end chamber 9, which faces the road surface and, in use, is brushed by the air flow flowing under the car 1.

According to a preferred embodiment, each end chamber 9 is arranged behind a corresponding rear wheel 3 so as to leave a larger space between the two rear wheels 3 for an aerodynamic extractor.

In the embodiments shown in the accompanying figures, the internal combustion engine 4 has eight cylinders 6 arranged in a V shape. Obviously, the internal combustion engine could have a different number of cylinders and/or a different arrangement of the cylinders; in case of internal combustion engines with inline cylinders (hence, with one single bank of cylinders), there usually is one single exhaust duct 7 and, therefore, one end chamber 9.

In the embodiments shown in the accompanying figures, the internal combustion engine 4 is supercharged; according to other embodiments which are not shown herein, the internal combustion engine 4 is not supercharged, namely it is an aspirated engine.

The embodiments described herein can be combined with one another, without for this reason going beyond the scope of protection of the invention.

The exhaust system 6 described above has numerous advantages.

First of all, the exhaust system 6 described above allows for an ideal silencing at low engine speeds and, at the same time, allows the exhaust back pressure to be minimized at high engine speeds.

In particular, the exhaust system 6 described above, by properly adjusting both the width and/or the shape of each outlet opening 10 (namely, by properly adjusting the sound amplification/damping ability of each variable geometry end chamber 9) and the position of each adjustment valves 14, allows for an optimization, in any possible operating condition, of the frequency response of each variable geometry end chamber 9.

In the embodiment shown in FIGS. 11, 12 and 13, the exhaust system 6 also has an aerodynamic effect that can be used when needed, namely when the speed of the car is high and, hence, aerodynamics is more important than silencing (namely, when the speed of the car exceeds 150-180 km/h).

The exhaust system 6 described above is particularly light and compact, since the silencer devices 11 have particularly small dimensions (for they operate together and in a combined manner with the respective variable geometry end chambers 9); namely, the overall silencing effect is not generated by the sole silencing devices 11, but is generated by the assembly consisting of the silencing devices 11 and the variable geometry end chambers 9 (hence, the silencer devices 11 can be significantly smaller than usual).

Finally, the exhaust system 6 described above is easy and economic to be manufactured, since, compared to a similar traditional exhaust system 6, it requires the addition of a few small-sized pieces which can easily be manufactured.

LIST OF THE REFERENCE NUMBERS OF THE FIGURES

1 car
2 front wheels
3 rear wheels
4 internal combustion engine
5 passenger compartment
6 exhaust system
7 exhaust duct
8 treatment devices
9 end chamber
10 outlet opening
11 silencer device
12 bypass duct
13 bifurcation
14 adjustment valve
15 tubular body
16 inlet opening
17 outlet opening
18 tubular body
19 inlet opening
20 base wall
21 base wall
22 side walls
23 movable partitions
24 actuator device
25 rotation axis
26 inlet opening
27 control unit
28 fixed wall

The invention claimed is:

1. An exhaust system (6) for an internal combustion engine (4); the exhaust system (6) comprises:

an end chamber (9) having a first inlet opening (19) and a second inlet opening (26), which are separate from and independent of one another, and an outlet opening (10), through which exhaust gases are released into the atmosphere;

an exhaust duct (7), which originates from the internal combustion engine (4) and leads to the first inlet opening (19) of the end chamber (9);

a silencer device (11), which has an outlet opening (17), which directly leads to the second inlet opening (26) of the end chamber (9);

a bypass duct (12), which originates from the exhaust duct (7) in the area of a bifurcation (13) and ends in an inlet opening (16) of the silencer device (11); and an adjustment valve (14), which can be electronically controlled, is arranged along the exhaust duct (7) downstream of the bifurcation (13) where the bypass duct (12) originates and is designed to adjust the exhaust gas flow towards the first inlet opening (19) of the end chamber (9);

wherein the end chamber (9) has at least one movable partition (23), which can be moved to different positions so as to change the width and/or the shape of the outlet opening (10);

wherein it is provided a motor-driven actuator device (24), which is configured to actively move the movable partition (23) and can be electronically controlled; and wherein it is provided a control unit (27), which is configured to change, by controlling the actuator device (24), the position of the movable partition (23) and to change a position of the adjustment valve (14);

wherein the end chamber (9) comprises at least one fixed wall (20) having the second inlet opening (26), through which the silencer device (11) leads; and wherein the movable partition (23) is hinged to the end chamber (9) in the area of a first fixed wall (20) so as to rotate around a rotation axis (25).

2. The exhaust system (6) according to claim 1, wherein the silencer device (11) is connected to the end chamber (9) so as to form one single body with the end chamber (9).

3. The exhaust system (6) according to claim 2, wherein the end chamber (9) increases in size towards the outlet opening (10) and the silencer device (11) has a shape that is complementary to the shape of the end chamber (9) and decreases in size towards the outlet opening (10).

4. The exhaust system (6) according to claim 1, wherein the second inlet opening (26) is arranged upstream of the movable partition (23) relative to the exhaust gas flow.

5. The exhaust system (6) according to claim 1, wherein the first fixed wall (20) also extends past the rotation axis (25) and, in a maximum expansion position, the movable partition (23) rests against the first fixed wall (20).

6. The exhaust system (6) according to claim 1, wherein the first fixed wall (20) ends in the area of the rotation axis (25) and the movable partition (23) delimits a lower surface of the end chamber (9) facing a road surface.

7. The exhaust system (6) according to claim 1, wherein the end chamber (9) increases in size towards the outlet opening (10), has a cross section with a rectangular shape and is delimited by two fixed base walls (20, 21), which are opposite one another and diverge towards the outlet opening (10), and by two fixed side walls (22), which are opposite and parallel to one another.

8. The exhaust system (6) according to claim 1, wherein the movable partition (23) can be moved between a maximum expansion position, in which the movable partition (23) causes the end chamber (9) to gain a diverging shape progressively increasing a cross section area as the first outlet opening (10) gets closer, and a minimum expansion position, in which the movable partition (23) causes the end chamber (9) to gain a converging shape progressively decreasing a cross section area as the first outlet opening (10) gets closer.

9. The exhaust system (6) according to claim 1, wherein:

the end chamber (9) has two movable partitions (23) opposite one another; and the actuator device (24) is configured to move the two movable partitions (23).

10. The exhaust system (6) according to claim 9, wherein:

the two movable partitions (23) are hinged so as to rotate around two respective rotation axes (25) parallel to one another;

the end chamber (9) has two fixed side walls (19), which are opposite and parallel to one another as well as perpendicular to the rotation axes (25);

the two movable partitions (23) are enclosed between the fixed side walls (19) and slide against the fixed side walls (19) when they move; and the end chamber (9) has two fixed base walls (20, 21), which are opposite one another and diverging as well as parallel to the rotation axes (25) and against which at least part of the movable partition (23) rests when it is in a maximum expansion position.

11. The exhaust system (6) according to claim 1, wherein the control unit (20) is configured to move the movable partition (23) towards a minimum expansion position in the presence of a small number of revolutions per minute and of small loads of the internal combustion engine (4) and to move the movable partition (23) towards a maximum expansion position in the presence of a large number of revolutions per minute and of great loads of the internal combustion engine (4).

12. An exhaust system (6) for an internal combustion engine (4); the exhaust system (6) comprises:

an end chamber (9) having a first inlet opening (19) and a second inlet opening (26), which are separate from and independent of one another, and an outlet opening (10), through which exhaust gases are released into the atmosphere;

an exhaust duct (7), which originates from the internal combustion engine (4) and leads to the first inlet opening (19) of the end chamber (9);

a silencer device (11), which has an outlet opening (17), which directly leads to the second inlet opening (26) of the end chamber (9);

a bypass duct (12), which originates from the exhaust duct (7) in the area of a bifurcation (13) and ends in an inlet opening (16) of the silencer device (11); and an adjustment valve (14), which can be electronically controlled, is arranged along the exhaust duct (7) downstream of the bifurcation (13) where the bypass duct (12) originates and is designed to adjust the exhaust gas flow towards the first inlet opening (19) of the end chamber (9);

wherein the end chamber (9) has at least one movable partition (23), which can be moved to different positions so as to change the width and/or the shape of the outlet opening (10);

wherein it is provided a motor-driven actuator device (24), which is configured to actively move the movable partition (23) and can be electronically controlled;

wherein it is provided a control unit (27), which is configured to change, by controlling the actuator device (24), the position of the movable partition (23) and to change a position of the adjustment valve (14);

wherein the two movable partitions (23) are hinged so as to rotate around two respective rotation axes (25) parallel to one another;

wherein the end chamber (9) has two fixed side walls (19), which are opposite and parallel to one another as well as perpendicular to the rotation axes (25);

wherein the two movable partitions (23) are enclosed between the fixed side walls (19) and slide against the fixed side walls (19) when they move; and wherein the end chamber (9) has two fixed base walls (20, 21), which are opposite one another and diverging as well as parallel to the rotation axes (25) and against which at least part of the movable partition (23) rests when it is in a maximum expansion position.

13. The exhaust system (6) according to claim 12, wherein the control unit (20) is configured to move the movable partition (23) towards a minimum expansion position in the presence of a small number of revolutions per minute and of small loads of the internal combustion engine (4) and to move the movable partition (23) towards a maximum expansion position in the presence of a large number of revolutions per minute and of great loads of the internal combustion engine (4).

14. The exhaust system (6) according to claim 12, wherein:

the end chamber (9) comprises at least one fixed wall (20) having the second inlet opening (26), through which the silencer device (11) leads;

the silencer device (11) is connected to the end chamber (9) so as to form one single body with the end chamber (9);

the end chamber (9) increases in size towards the outlet opening (10) and the silencer device (11) has a shape that is complementary to the shape of the end chamber (9) and decreases in size towards the outlet opening (10).

15. The exhaust system (6) according to claim 12, wherein the end chamber (9) increases in size towards the outlet opening (10), has a cross section with a rectangular shape and is delimited by two fixed base walls (20, 21), which are opposite one another and diverge towards the outlet opening (10), and by two fixed side walls (22), which are opposite and parallel to one another.

16. The exhaust system (6) according to claim 12, wherein the movable partition (23) can be moved between a maximum expansion position, in which the movable partition (23) causes the end chamber (9) to gain a diverging shape progressively increasing a cross section area as the first outlet opening (10) gets closer, and a minimum expansion position, in which the movable partition (23) causes the end chamber (9) to gain a converging shape progressively decreasing a cross section area as the first outlet opening (10) gets closer.

17. The exhaust system (6) according to claim 12, wherein:

the end chamber (9) has two movable partitions (23) opposite one another; and the actuator device (24) is configured to move the two movable partitions (23).

* * * * *